United States Patent [19]

Brugger

[11] 3,959,447

[45] May 25, 1976

[54] PROCESS FOR THE PREPARATION OF CARBONATED HYDRATED ZIRCONIUM OXIDE

[75] Inventor: Wilhelm Brugger, Hosel, Germany

[73] Assignee: Th. Goldschmidt AG, Germany

[22] Filed: Oct. 30, 1974

[21] Appl. No.: 519,242

[30] Foreign Application Priority Data
Nov. 28, 1973 Germany............................ 2359173

[52] U.S. Cl. .............................................. 423/419
[51] Int. Cl.² ......................................... C01G 25/00
[58] Field of Search..................... 423/419, 414, 415

[56] References Cited
UNITED STATES PATENTS 2,316,141  4/1943  Wainer .............................. 423/419
3,510,254  5/1970  Bell .................................... 423/419
3,551,095  12/1970  Blumenthal ....................... 423/419

OTHER PUBLICATIONS

Mellan, "Industrial Solvents", Book Division, Reinhold Publishing Company, New York, N.Y., 2nd Ed., 1950, p. 14.

*Primary Examiner*—Earl C. Thomas
*Attorney, Agent, or Firm*—James E. Bryan

[57] ABSTRACT

This invention relates to a process for preparing carbonated hydrated zirconium oxide which comprises dispersing zirconium oxychloride in an inert, non-polar solvent and reacting it, without the addition of water, with an at least equimolar quantity of ammonium carbonate or potassium carbonate, and separating the reaction product.

3 Claims, No Drawings

PROCESS FOR THE PREPARATION OF CARBONATED HYDRATED ZIRCONIUM OXIDE

The present invention relates to a process for the preparation of carbonated hydrated zirconium oxide by reaction of zirconium oxychloride with ammonium carbonate or alkali carbonate.

Carbonated hydrated zirconium oxide, which may be expressed, for example, with the formula $$Zr_2O_3(OH)_2CO_2 \cdot 7H_2O$$

is a valuable intermediate product which, when dried at a temperature of 120° to 130°C, passes over into an extremely basic carbonated hydrated zirconium oxide and which, when calcined at temperatures above 800° to 900C, yields zirconium oxide.

Zirconium oxide compounds are employed for the manufacture of high-quality optical glasses, dielectric and piezoelectric compounds, as well as for the preparation of ceramic color pigments, for example of the type zirconium oxide/vanadium pentoxide/indium oxide. The carbonated hydrated zirconium oxide — which is dried, if desired, at a temperature of 120° to 130°C — may be added to the mixture to be calcined during the preparation of the above-mentioned products. It is also possible, however, to directly add the zirconium oxide, calcined at 800° to 900°C, to the batch or to the melt.

For the above-mentioned purposes of application, it is necessary that the starting zirconium compound be present in a high degree of purity. According to the state of the art, carbonated hydrated zirconium oxide is prepared by reacting aqueous solutions of zirconium oxy- or zirconium sulfate with ammonium carbonate or alkali carbonate, at which time an extremely voluminous gelatinous deposit of carbonated dizirconium-trioxo-dihydroxy-heptahydrate is formed. This gelatinous deposit can barely be filtered. It envelops all the impurities that are contained in the solution, and because of its gelatinous state, it also cannot be washed chloride-free. However, precisely the removal of the impurities and the removal of the chlorides is of particular importance for the further utilization of the product.

It is the object of the present invention to eliminate the disadvantages of the art, as described above.

It surprisingly has been found that this object is obtained when zirconium oxychloride.8 $H_2O$ is dispersed in an inert non-polar solvent and reacted, without the addition of water, with at least equimolar quantities of either ammonium carbonate or potassium carbonate, the reaction product is filtered off, washed chloride-free with water, and dried.

For example, the chlorinated aliphatic compounds, such as for instance perchloroethylene and homologous compounds, are useful as inert non-polar solvents. The reaction of the ammonium carbonate or potassium carbonate with the zirconyl-chlorideoctahydrate takes place at room temperature; it is complete after 1 to 1 ½ hours. The carbonized hydrated zirconium oxide which is formed at that time is yielded as a coarse powder, is easily deposited as a sediment, and may be filtered off and rinsed without difficulty. As a consequence of the specific process conditions, no impurities are included within the deposit. The product may be dried, in the conventional manner, at a temperature of 120° to 130°C to an extremely basic carbonized hydrated zirconium oxide, and/or calcined at a temperature of 800° to 900°C to a very pure zirconium oxide which is particularly suited for the aforementioned purposes of application.

The reaction equation upon which the reaction is based also may be defined by the following equation:

$$2\ ZrOCl_2 \cdot 8\ H_2O + 2\ (NH_4)_2CO_3 \rightarrow Zr_2O_3(OH)_2CO_2 \cdot 7H_2O + 4\ NH_4Cl + 8\ H_2O + CO_2$$

In this reaction equation, as well as in the statements made hereinabove, the basic premise quite generally is that what are involved are not pure zirconium compounds, but the zirconium/hafnium compounds occurring in nature in association, wherein the hafnium constituent is not separated and also need not be separated.

The inventive process will now be described in further detail in the following example:

EXAMPLE 323 grams of $ZrOCl_2 \cdot 8\ H_2O$ are dispersed in 800 ml of perchloroethylene in a 2-liter beaker. In order to prevent settling of the zirconium oxychloride, the dispersion is continuously stirred with a conventional laboratory stirrer. Added to the dispersion at a temperature of 20°C and over the course of 10 minutes, are 112 grams of ammonium carbonate. The reaction mixture is further stirred for 1 ½ hours at which time a large quantity of carbon dioxide escapes, particularly in the beginning. The stirrer is then turned off and removed. The reaction mixture is allowed to settle, and filtered from the perchloroethylene. Since the perchloroethylene does not moisten the deposit, a perchloroethylene-free residue is obtained.

The filter cake is washed chloride-free five times with distilled water. After drying at 120°C, 136 grams of extremely basic carbonated hydrated zirconium oxide are obtained. When the product is calcined at 800° to 900°C, 124 grams of zirconium oxide are obtained as a calcined residue.

It will be obvious to those skilled in the art that many modifications may be made within the scope of the present invention without departing from the spirit thereof, and the invention includes all such modifications.

What is claimed is:

1. A process for preparing carbonated hydrated zirconium oxide which comprises dispersing zirconium oxychloride in an inert, non-polar solvent and reacting it, without the addition of water, with an at least equimolar quantity of ammonium carbonate or potassium carbonate, and separating the reaction product.

2. A process according to claim 1 in which the reaction product is washed chloride-free with water and dried.

3. A process according to claim 1 in which the solvent is perchloroethylene.

* * * * *